(12) United States Patent
Lin et al.

(10) Patent No.: US 11,537,616 B1
(45) Date of Patent: Dec. 27, 2022

(54) PREDICTING QUERY PERFORMANCE FOR PRIORITIZING QUERY EXECUTION

(71) Applicant: Amazon Technologies, Inc., Seattle, WA (US)

(72) Inventors: Chunbin Lin, Dublin, CA (US); Naresh Chainani, Mountain View, CA (US); Gaurav Saxena, Cupertino, CA (US); George Constantin Caragea, Redwood City, CA (US); Mohammad Rezaur Rahman, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 16/915,928

(22) Filed: Jun. 29, 2020

(51) Int. Cl.
  G06F 7/00 (2006.01)
  G06F 16/2453 (2019.01)
  G06N 5/04 (2006.01)
  G06N 20/00 (2019.01)

(52) U.S. Cl.
  CPC ......... G06F 16/24549 (2019.01); G06N 5/04 (2013.01); G06N 20/00 (2019.01)

(58) Field of Classification Search
  CPC ......... G06F 16/24549; G06F 16/24532; G06F 16/24542; G06F 16/24561; G06F 16/285; G06F 16/2458; G06N 20/00; G06N 5/04
  See application file for complete search history.

(56) References Cited

U.S. PATENT DOCUMENTS

| | | | |
|---|---|---|---|
| 6,769,017 B1 | 7/2004 | Bhat et al. | |
| 7,058,622 B1 | 6/2006 | Tedesco | |
| 8,762,366 B1 | 6/2014 | Becerra | |
| 9,032,017 B1 | 5/2015 | Singh et al. | |
| 9,477,710 B2 | 10/2016 | Narasayya et al. | |
| 10,922,316 B2 | 2/2021 | Saxena | |
| 2005/0192937 A1 | 9/2005 | Barsness | |
| 2008/0195577 A1 | 8/2008 | Fan | |
| 2008/0270346 A1 | 10/2008 | Mehta et al. | |
| 2009/0216718 A1* | 8/2009 | Agrawal | G06F 16/24549 |
| 2009/0254774 A1 | 10/2009 | Chamdani et al. | |
| 2010/0082603 A1 | 4/2010 | Krompass et al. | |
| 2011/0153662 A1 | 6/2011 | Stanfill et al. | |
| 2012/0215764 A1* | 8/2012 | Barsness | G06F 16/951 |
| | | | 707/720 |
| 2013/0226903 A1 | 8/2013 | Wu | |
| 2014/0019415 A1 | 1/2014 | Barker et al. | |
| 2016/0188696 A1 | 6/2016 | Belghiti | |
| 2016/0203404 A1* | 7/2016 | Cherkasova | G06N 5/04 |
| | | | 706/12 |
| 2017/0213257 A1 | 6/2017 | Murugesan | |
| 2017/0372230 A1 | 12/2017 | Kuromatsu | |

(Continued)

OTHER PUBLICATIONS

U.S. Appl. No. 16/364,055, filed Mar. 25, 2019, Mingda Li et al.

*Primary Examiner* — Mohammad A Sana

(74) *Attorney, Agent, or Firm* — S. Scott Foster; Kowert, Hood, Muynon, Rankin & Goetzel, P.C.

(57) ABSTRACT

Performance measures are predicted for queries to prioritize query performance at a database system. A trained machine learning model for the database system may be applied to a query to determine a predicted performance measure for the query. The predicted performance measure may be compared with other predicted performance measures for other waiting queries to determine a priority for executing the query.

20 Claims, 9 Drawing Sheets

(56) References Cited

U.S. PATENT DOCUMENTS

| | | |
|---|---|---|
| 2018/0060132 A1 | 3/2018 | Maru et al. |
| 2020/0285642 A1* | 9/2020 | Bei .................... G06F 16/9027 |
| 2021/0286784 A1* | 9/2021 | Chen ..................... G06N 20/00 |

* cited by examiner

PREDICTING QUERY PERFORMANCE FOR PRIORITIZING QUERY EXECUTION

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amount of data that organizations must store and manage often correspondingly slows system performance when accessing stored data.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for predicting query performance for prioritizing query execution are described herein. Different queries may have different performance at a database system according to various factors, such as query operations, type or layout of database data, among others, in some embodiments. In order to provide good performance for queries, database systems may implement predicting query performance for prioritizing query execution. In this way, a database system can order queries using a performance measurement predicted for a query. For example, a long running query (e.g., 5 minutes execution time) could block a short query (e.g., 2 seconds execution time) without a capability to predict that the short query could be performed first with little detriment to the long running query (e.g., as an additional 2 seconds is much smaller percentage performance). Moreover, prioritizing query execution according to predicted query performance can allow for better utilization of database system resources to perform queries. For example, preemption of long-running queries can be reduced (or eliminated) saving the various performance costs of performing a context switch between different queries (e.g. as a shorter query can first and not have to preempt a longer running query).

Figure 1:
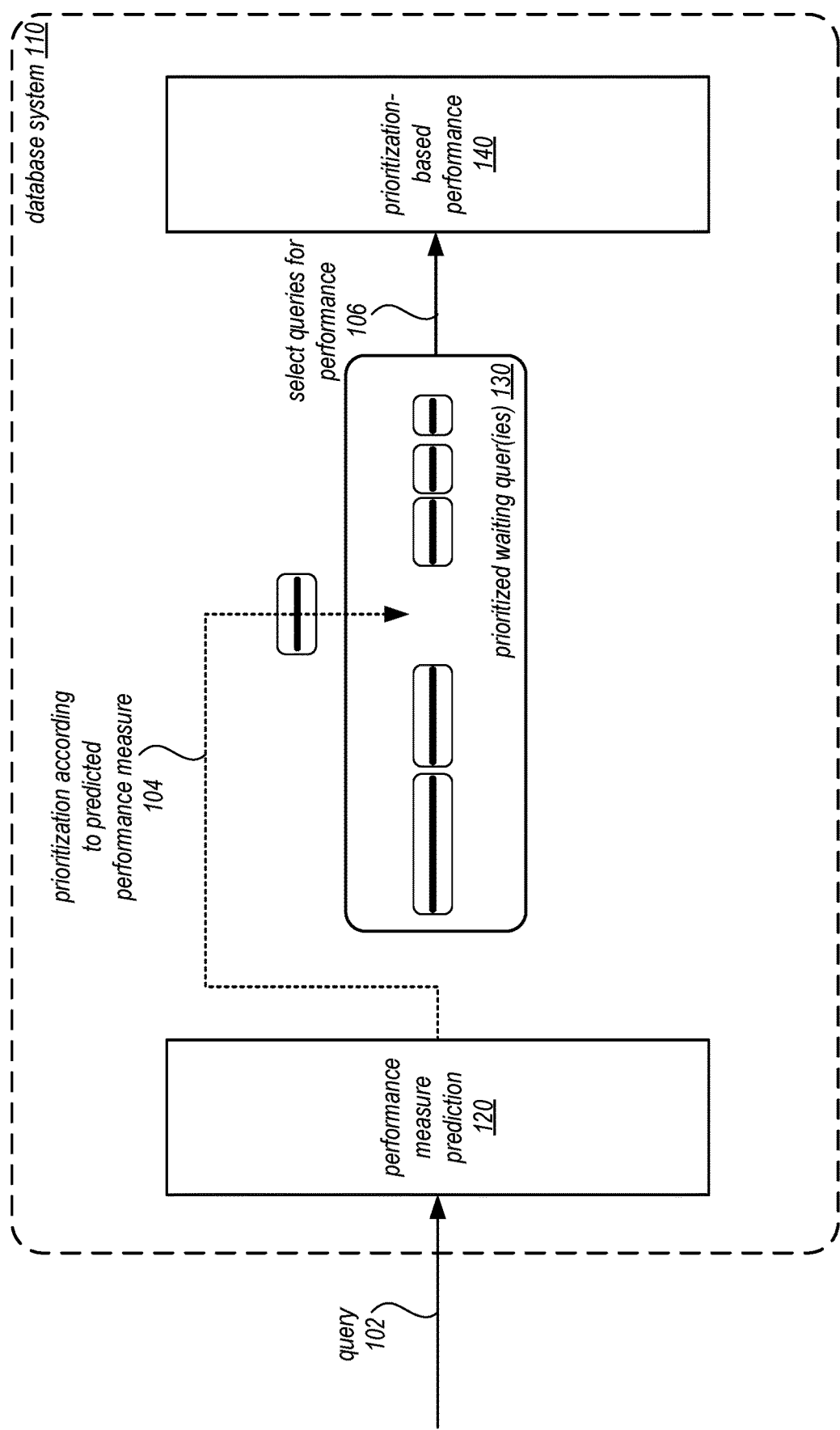
FIG. 1 is a logical block diagram illustrating predicting query performance for prioritizing query execution, according to some embodiments

FIG. 1 is a logical block diagram illustrating predicting query performance for prioritizing query execution, according to some embodiments. Database 110 may be a database or other data store that provides management, maintenance, and/or access to data or information. For example, database 110 may be a relational database that provides online transactional processing (OLTP), such as may be found in databases supporting transaction heavy workloads, or online analytical processing (OLAP), such as may be data warehouse style databases that support heavy analytical workloads. Database system 110 may implement prioritization based performance 140 in order to select and perform queries in a priority ordering determined according to predicted query performance. As query performance may not be known before a query is actually performed, performance measure prediction 120 may be implemented.

For example, performance measure prediction 120 may receive a query 102 and determine a predicted performance measure (e.g., execution time and/or resource usage) for that query. The predicted performance measure may be determined from a machine learning model trained specifically for database system 110 and the data targeted by the query (e.g., the specific database) by using previously performed queries to train the machine learning model. As discussed in detail below with regard to FIGS. 4-8, performance measure predictions may be used to determine a prioritization for the query, as indicated at 104, according to the predicted performance measure when compared with prioritized waiting quer(ies) 130 (which may also have predicted performance measures of the same type), in some embodiments.

Prioritization-based performance 140 can then select queries for performance, as indicated at 106, according to their assigned priorities. For example, high priority queries can be selected more frequently than lower priority queries, in some embodiments.

The data or information for database 110 may be organized into collections, groups, or sets of related information, such as tables. For example, table(s) may be organized according to a table schema that specifies the number and data types (e.g., character, string, integer, floating point, etc.), column names, and/or other table information. Entries of table(s) may be individual items or rows that include values for different columns (including null values in some embodiments). Client applications of database 110 may submit queries or other requests to retrieve, manipulate, process and/or otherwise return information from database data, such as query 102.

Please note that the previous description of a database system, prioritization of waiting queries, performance measure prediction and performance, and various interactions, are logical descriptions and thus is not to be construed as limiting as to the implementation of these features.

This specification begin with a general description of a provider network that implements database services (or other data storage or processing services) that may implement computer resources to perform database queries and implement predicting query performance for prioritizing query execution. Then various examples of one such database service, including different components/modules, or arrangements of components/module that may be employed as part of implementing the techniques are discussed. A number of different methods and techniques to implement predicting query performance for prioritizing query execution, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
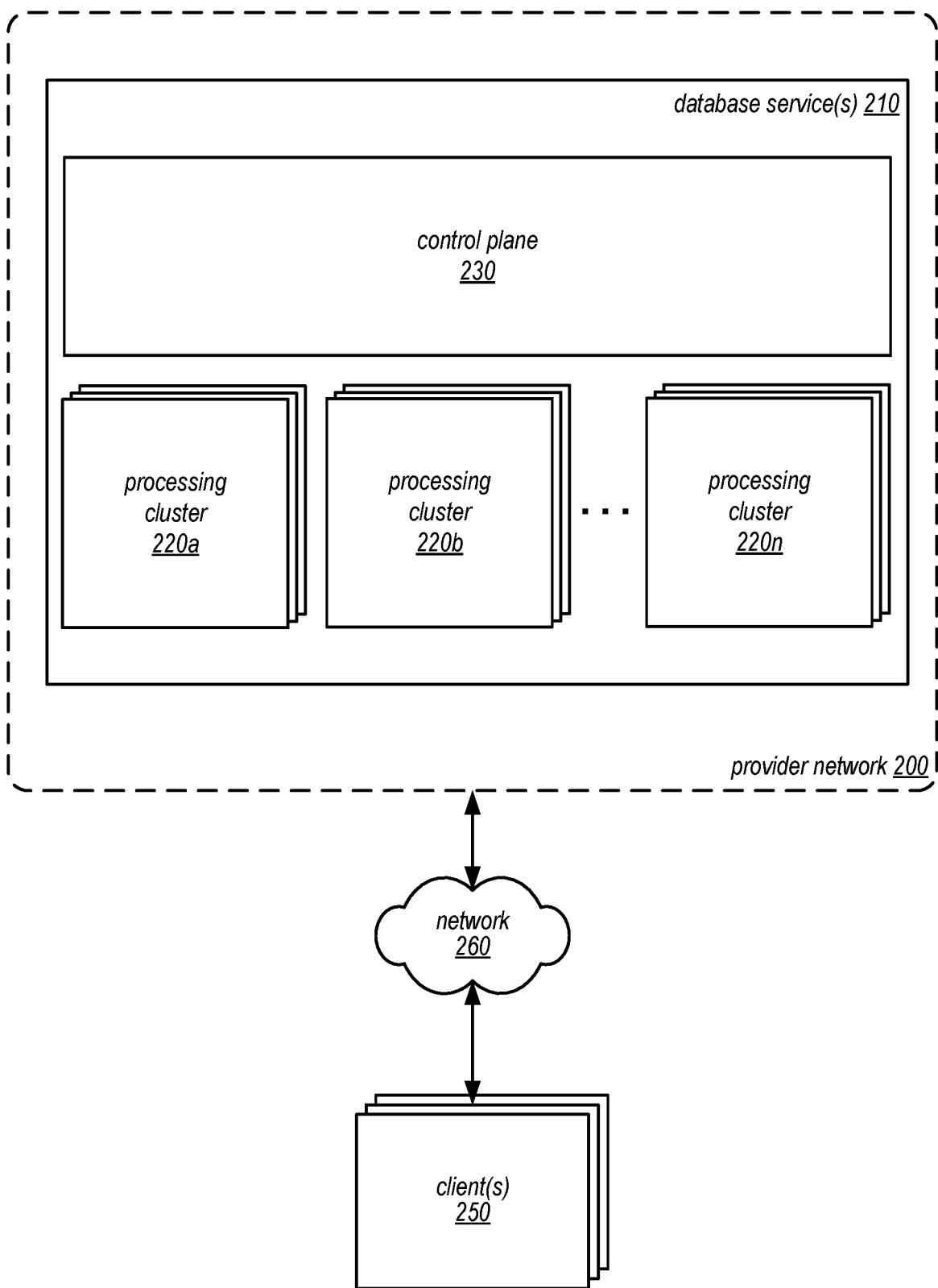
FIG. 2 is a logical block diagram illustrating a provider network offering a database service that provides predicting query performance for prioritizing query execution, according to some embodiments.

FIG. 2 is a logical block diagram illustrating a provider network offering a database service that provides predicting query performance for prioritizing query execution, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contain uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 9, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
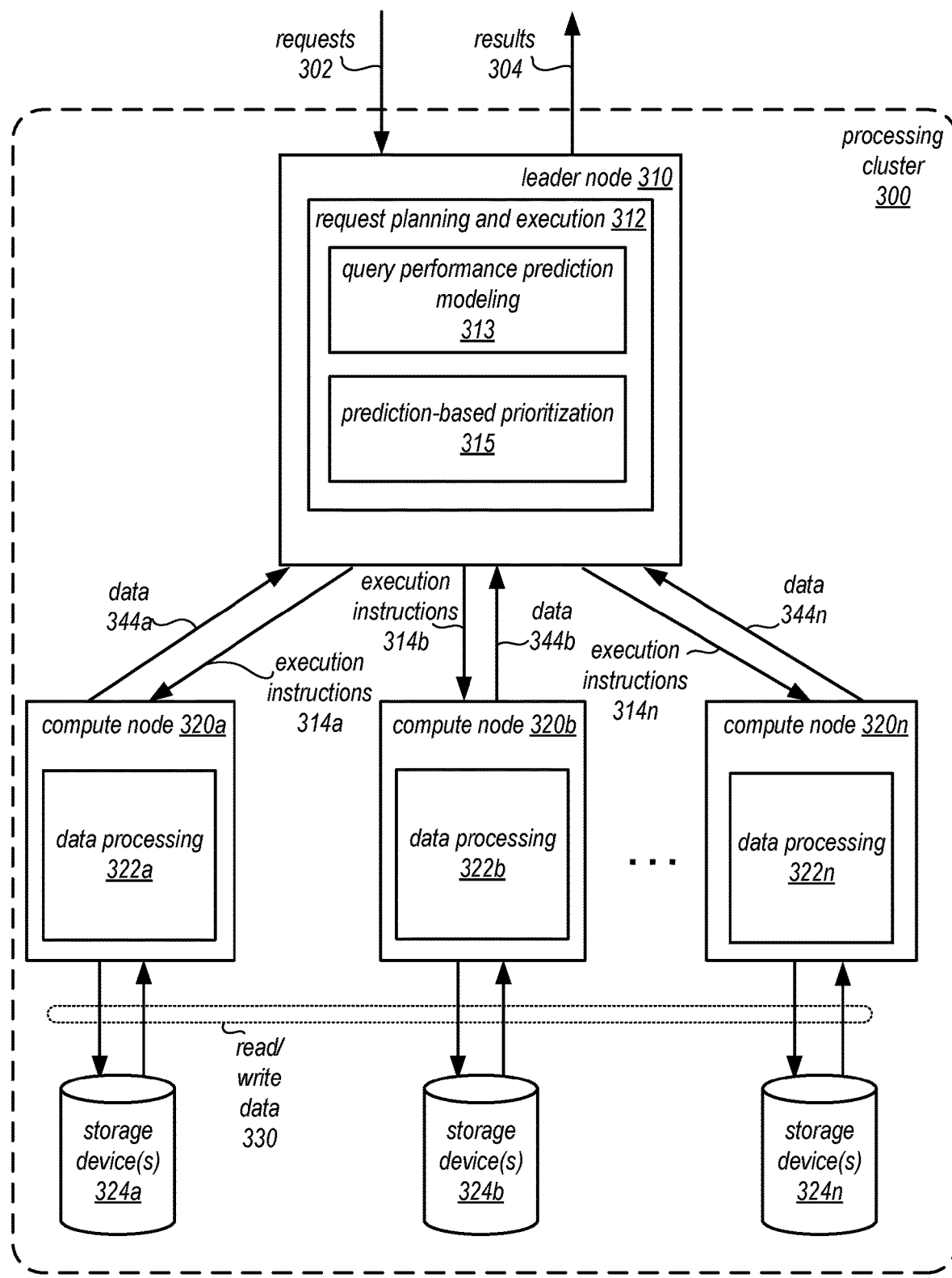
FIG. 3 is a logical block diagram illustrating a processing cluster of a database service that implements prioritized query execution and performance prediction, according to some embodiments.

FIG. 3 is a logical block diagram illustrating a processing cluster of a database service that implements prioritized query execution and performance prediction, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over a network or other interconnect (not illustrated), in one embodiment. Leader node 310 may implement request planning 312 to generate plan(s) and instructions 314 for executing various requests 302, such as query, or requests to update, add, modify, or remove data, on processing cluster 300, in one embodiment.

For example, request planning and execution 312 may implement query performance prediction modeling 313, as discussed in detail below with regard to FIG. 5, and prediction-based prioritization 315, as discussed in detail below with regard to FIG. 4. In this way, request planning and execution 312 can provide prioritized performance of queries based on predicted performance measures, as discussed above with regard to FIG. 1.

Leader node 310 may implement materialized view management 316, discussed in detail below with regard to FIG. 4, to create and update materialized views. Leader node 310 may also implement metric planning history/performance metric collection (not illustrated) to collect and report performance metrics collected for various events, units of work, or other portions a query or other operation's performance, compute node or leader node performance, and history of operations performed, in some embodiments, which can be used to update priority and train models, as discussed below. As described herein, each node in a processing cluster 300 may include attached storage, such as storage device(s) 324a, 324b, and 324n, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 9, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
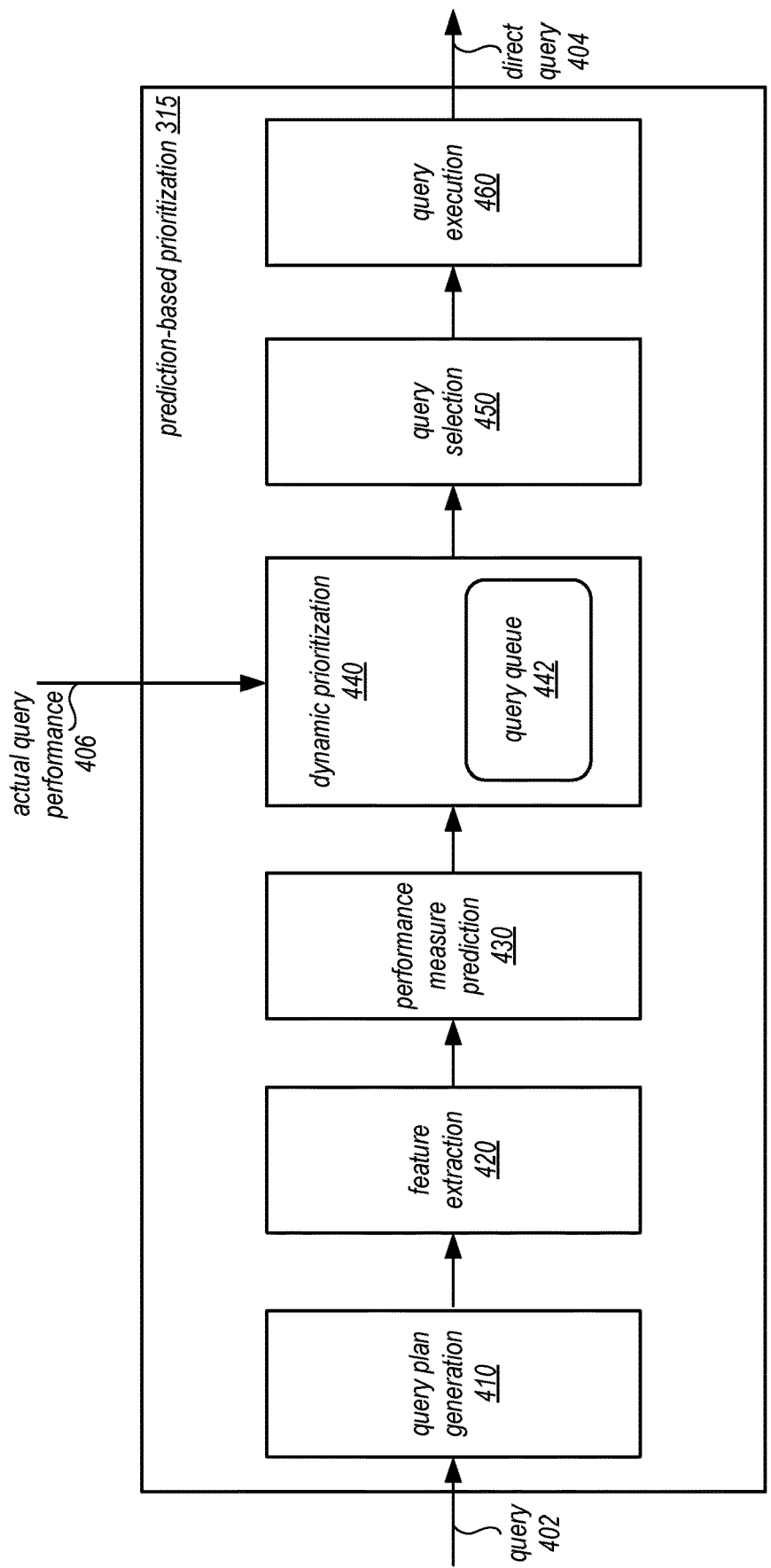
FIG. 4 is a logical block diagram illustrating prioritized query execution, according to some embodiments.

FIG. 4 is a logical block diagram illustrating prioritized query execution, according to some embodiments. Prediction-based prioritization 315 may receive a query 402. Query plan generation 410 may utilize various information about the data and query to determine a plan (e.g., table statistics, table schema, etc.). In some embodiments, a plan may be an execution tree or other set of instructions that identify different operations (e.g. scan, filter, join, insert, etc.) to perform. Feature extraction 420 may be implemented some embodiments, to evaluate the generated query plan to determine features (e.g., from query plan nodes and/or relations between nodes). The extracted features may be provided to performance measure prediction 430, in some embodiments.

Performance measure prediction 430 may use the features as inputs to a deployed machine learning model for performance prediction (e.g., as input parameters to a neural network). The predicted performance measure(s) may then be used by dynamic prioritization 440 to place the query in a query queue 442 for waiting queries. Query queue 442 may order queries according to performance measure predicted values (e.g., smallest to largest). In some embodiments, the priority value of a query may be assigned according to its position in the queue 442 (e.g., first five queries are highest priority level, next five are second highest, and so on).

In various embodiments, query selection 450 may obtain queries from query queue 442 according to the priority and provide them to query execution 460 which may direct the query, as indicated at 440. As discussed below with regard to FIG. 7, actual query performance 406 may be used by dynamic prioritization to update executing query performance.

Figure 5:
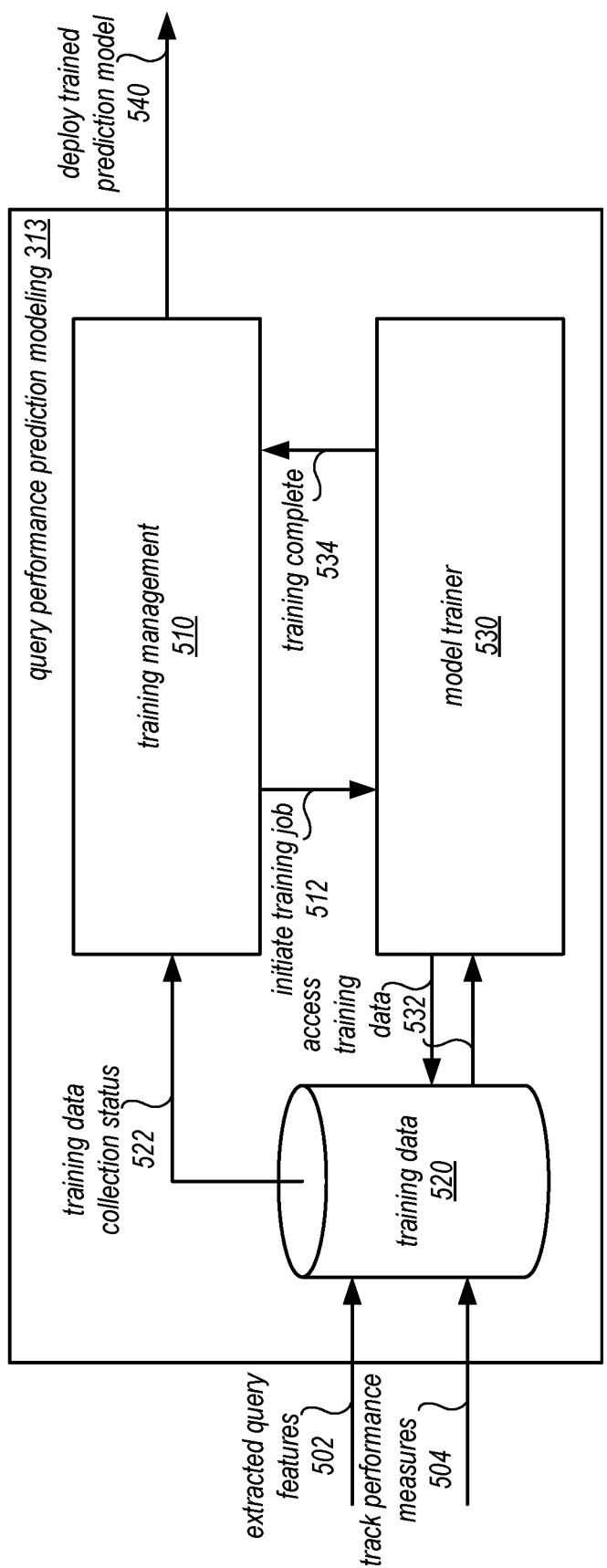
FIG. 5 is a logical block diagram illustrating query performance prediction modeling, according to some embodiments.

FIG. 5 is a logical block diagram illustrating query performance prediction modeling, according to some embodiments. Query performance prediction modeling 313 may provide trained performance measure prediction models specific to a database system and data (e.g., the database or other collection of data, such as tables). Although illustrated as part of leader node 310, query performance prediction modeling 313 could be performed as part of a control plane 230 or other separate system or service, in some embodiments.

Query performance prediction modeling 313 may implement the collection of training data 520, in some embodiments. For example, extracted query features 502 (as discussed above) and performance measures tracked for executing queries 504 may be obtained (e.g., by query engines or other components that monitor query performance) and stored as part of training data 520. Training management 510 may be implemented to detect and handle training events for a database, by determining from training data collection status 522 whether a training threshold is satisfied, as discussed below with regard to FIG. 7.

Training management 510 may initiate a training job 512 to model trainer 530, in some embodiments, in order to access training data 532 and perform learning techniques, such as supervised learning to train a model to predict a performance measure (or measures) given an input set of query features. When model trainer 530 completes the job, a training complete indication 534 may be provided to training management 510. Training management 510 may then deploy the trained prediction model 540 (e.g., by storing, or updating a prediction model used, as discussed above). In some embodiments, deployment may include enabling the application of the model for received queries.

Figure 6:
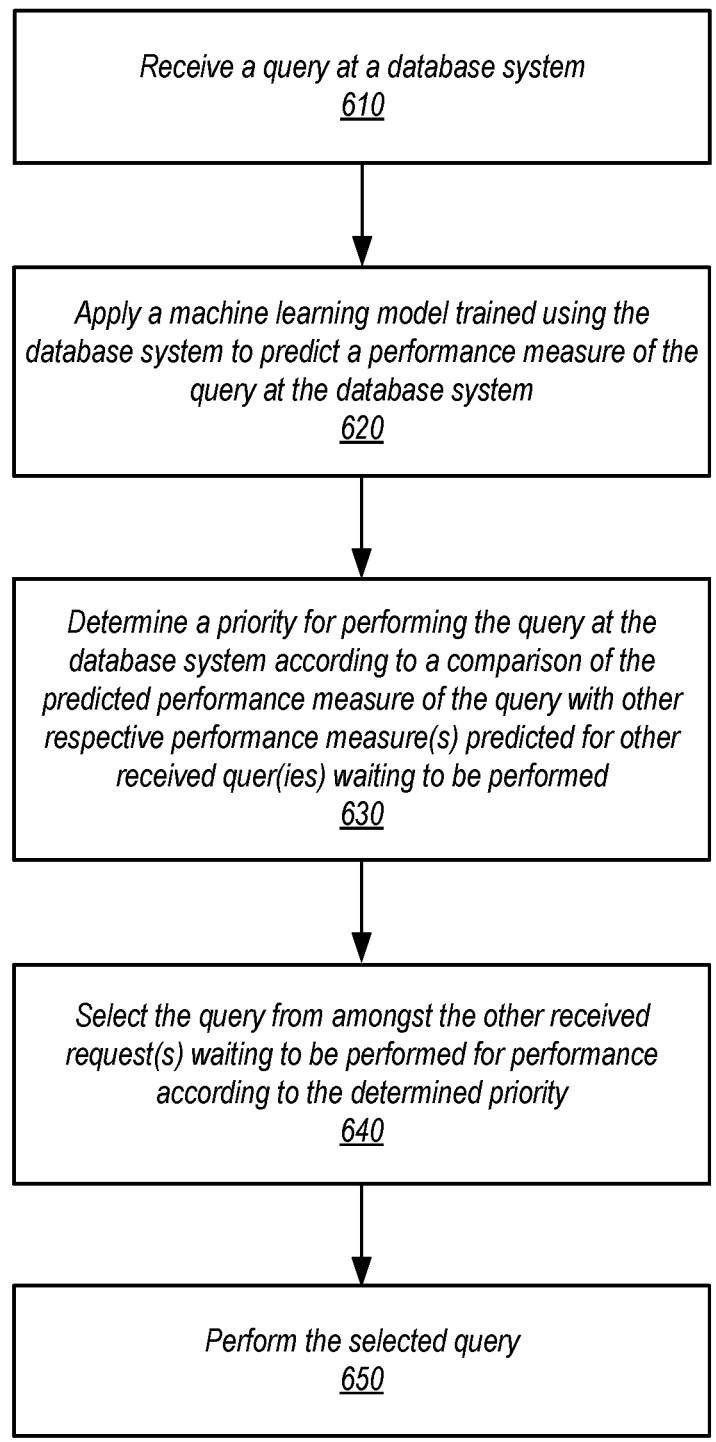
FIG. 6 is a high-level flowchart illustrating methods and techniques to implement predicting query performance for prioritizing query execution, according to some embodiments.

Although FIGS. 2-5 have been described and illustrated in the context of a database service, like a data warehouse service implementing a columnar relational database table, the various components illustrated and described in FIGS. 2-5 may be easily applied to other database or data storage systems that can benefit from prioritizing queries for performance. As such, FIGS. 2-5 are not intended to be limiting as to other embodiments of a storage engine, query engine, a single or distributed database engine or management system, processing cluster, or other component that may implement using computer resources to predict query performance for prioritizing query execution, including resources, hosts, systems, or devices that are separate from the query engine or database management system itself (e.g., an external data replication store or system). FIG. 6 is a high-level flowchart illustrating methods and techniques to implement predicting query performance for prioritizing query execution, according to some embodiments. Various different systems and devices may implement the various methods and techniques described below, either singly or working together. For example, a processing cluster, such as described above with regard to FIGS. 2-5 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 610, a query may be received at a database system, in some embodiments. A query may be specified according to a query language (e.g., SQL) or protocol, or may be invoked by an API or other instruction. A query may include various kinds of operations, such as requests to add, remove, read, analyze, return, modify, or otherwise access data stored in database system, in some embodiments. In some embodiments, predicting query performance may be enabled or disabled for queries (or for the database system as a whole) by a request via a database system interface (e.g., to start predictions or stop predictions for queries received after the request). In some embodiments, query execution preemption may be disabled when performance measure predictions are enabled.

As indicated at 620, a machine learning model trained using the database system may be applied to predict a performance measure of the query at the database system, in some embodiments. For example, query features may be extracted (e.g., by generating a query plan to use the nodes or operations and/or relations of the plan as features), in some embodiments. The features may then be used as the input parameters for the model (e.g., a decision tree, neural network, etc.) that has been trained specifically on queries to the database system and same database data (e.g., the collection of tables/data in a single database). The model may provide a performance measure (or multiple performance measures), in some embodiments. Performance measures may include, but are not limited to, total execution time, memory usage, network usage, processor usage, other resource usage, or other performance characteristics of queries, in some embodiments.

As indicated at 630, a priority may be determined for performing the query at the database system according to a comparison of the predicted performance measure of the query with other respective performance measure(s) predicted for other received quer(ies) waiting to be performed, in some embodiments. For example, as discussed above with regard to FIG. 4, a queue may be implemented that orders waiting queries according to performance measure value (e.g., shortest to longest). The query may be inserted into the queue according to the predicted performance measure value and assigned a priority corresponding to the location of the query in the queue. Other priority assignment techniques may be implemented in other embodiments using the predicted performance measure comparison. In some embodiments, a baseline priority may be assigned for those queries with performance measures below an average performance measure value.

As indicated at 640, the query may be selected from amongst the other received request(s) waiting to be performed for performance according to the determined priority, in some embodiments. For example, higher priority value queries may be selected for performance more frequently than lower priority value queries (e.g., using a weighted round-robin selection scheme). As indicated at 650, the selected query may be performed, in some embodiments.

Figure 7:
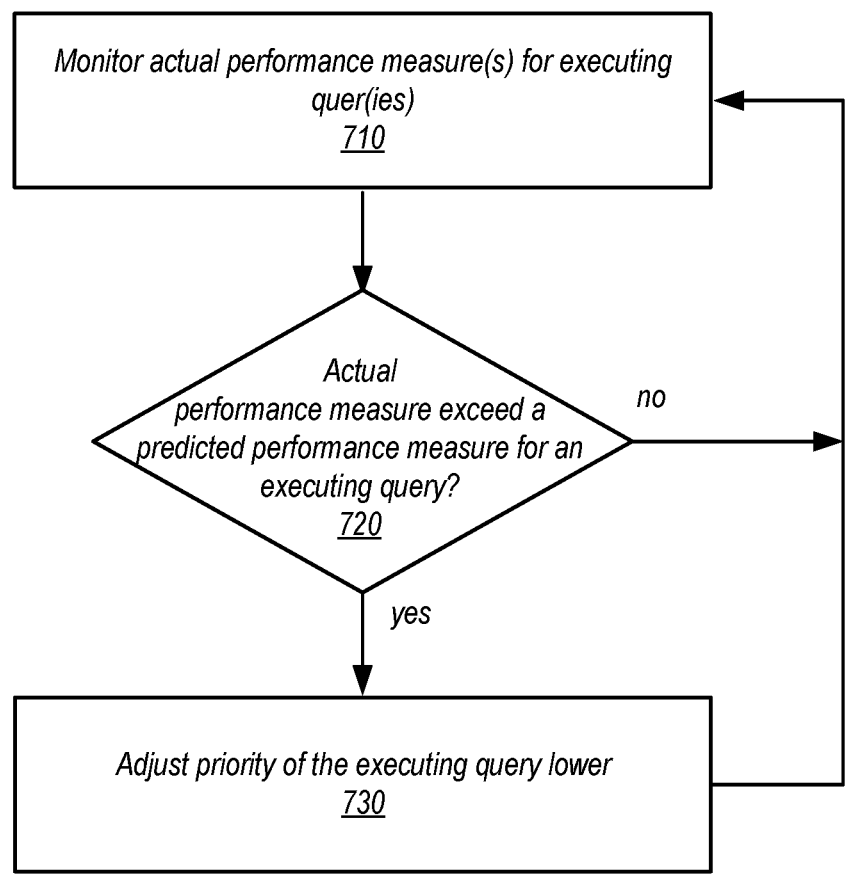
FIG. 7 is a high-level flowchart illustrating methods and techniques to implement dynamically adjusting priority of executing queries, according to some embodiments.

In addition to determining query performance priority when they are received, priority for queries may be adapted after execution begins. In this way, the impact of inaccurate performance predictions can be limited. FIG. 7 is a high-level flowchart illustrating methods and techniques to implement dynamically adjusting priority of executing queries, according to some embodiments. Actual performance measures (corresponding to predicted performance measures) may be monitored for executing quer(ies), in some embodiments, as indicated at 710. For example, memory usage or network bandwidth may be tracked while a query is performed (e.g., at one or across multiple nodes).

If, as indicated at 720, the actual performance measure exceeds the predicted performance for an executing query (e.g., the current running execution time for a query has exceeded a total predicted execution time), then as indicated by the positive exit from 720, priority of the executing query may be adjusted lower, in some embodiments. For example, priority value of current executing queries may be used to determine the number, length, duration, or other aspect of query performance (where a lower priority query may be interrupted or reduced in resource allocation for performing the query corresponding the amount of the reduction of the priority), in some embodiments. As indicated by the negative exit from 720 (and from the exit of 730), monitoring may be continually performed, in some embodiments, in order to adapt the priority of queries when predictions are not accurate. In some embodiments, if a threshold number of inaccurately predicted queries is exceeded, prediction may be disabled. In some embodiments, prediction may be re-enabled after obtaining a greater training set than was initially used to train the machine learning model and updating the model using the greater training set.

Figure 8:
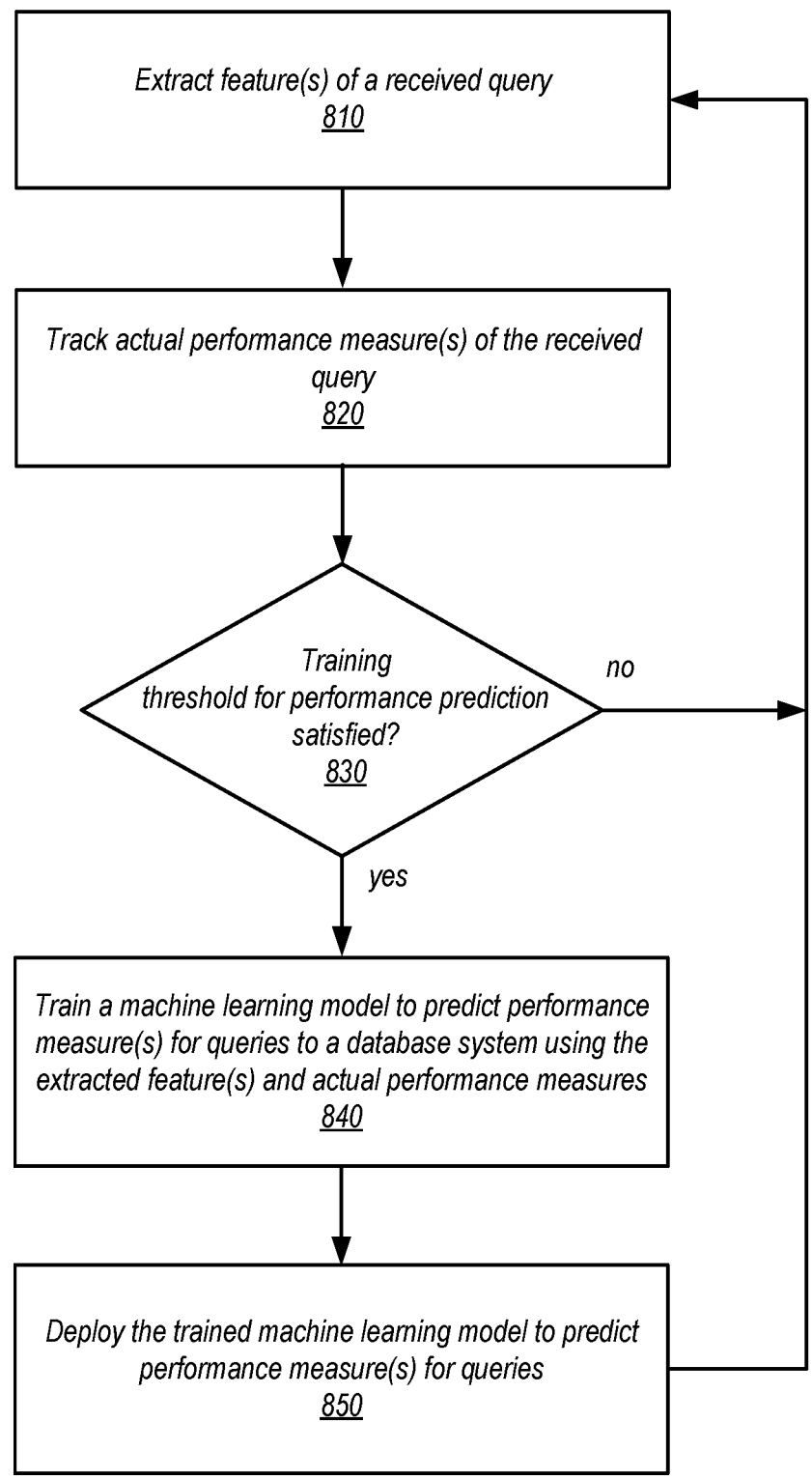
FIG. 8 is a high-level flowchart illustrating methods and techniques to implement training query performance prediction models, according to some embodiments.

FIG. 8 is a high-level flowchart illustrating methods and techniques to implement training query performance prediction models, according to some embodiments. As indicated at 810, features of a received query may be extracted, in some embodiments. Query features may include information such as the source of the query, tables or other objects targeted by the query, time of day, among others, in some embodiments. In some embodiments, extracted features may be determined by a query plan (e.g., nodes of a plan tree generated as discussed above with regard to FIGS. 4 and 5).

As indicated at 820, actual performance measure(s) of the received query may be tracked, in some embodiments. For example, the performance measures to be predicted (for subsequent queries), may be measure during and after query performance, such as query execution time or resource usage (e.g., memory, network, processor, etc.), in some embodiments. In distributed database systems, like those discussed above with regard to FIGS. 3-5, performance measures may be aggregated or collected from multiple different nodes that participate in query performance. In some embodiments, a log or other data store may be used to record information, such as start and complete times (which can then be read to calculate performance measures like execution time).

As indicated at 830, a training threshold for performance prediction may be evaluated to see if sufficient information has been collected to train a performance measure prediction model, in some embodiments. For example, a minimum number of queries (e.g., 300 queries) may be received to satisfy the training performance. In some embodiments, the threshold may change (e.g., 300 for an initial model training and 600 for an update model training). If the training threshold is not satisfied, then further information from subsequent queries may be collected, as indicated by the loop back to element 810).

As indicated at 840, a machine learning model to predict performance measure(s) for queries to a database system using the extracted features and actual performance measures may be trained, in some embodiments. For example, a supervised learning algorithm that utilizes the actual measurements as the labels for the various extracted features can be used to train a machine learning model (e.g., neural network, decision tree, such as a non-linear decision tree, and so on) to determine a predicted performance measure value given a set of input features for a query, in some embodiments. In some embodiments, hyperparameters for the machine learning model may be specified by the database system (e.g., by default) or in other embodiments may be configurable by a user of the database system.

As indicated at 850, the trained machine learning model may be deployed to predict performance measure(s) for queries, in some embodiments. For example, the trained machine learning model may be stored, copied, or moved to be a new (or updated, replacement) model that is applied, as discussed above.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of using computer resources to implement predicting query performance for prioritizing query execution as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 9:
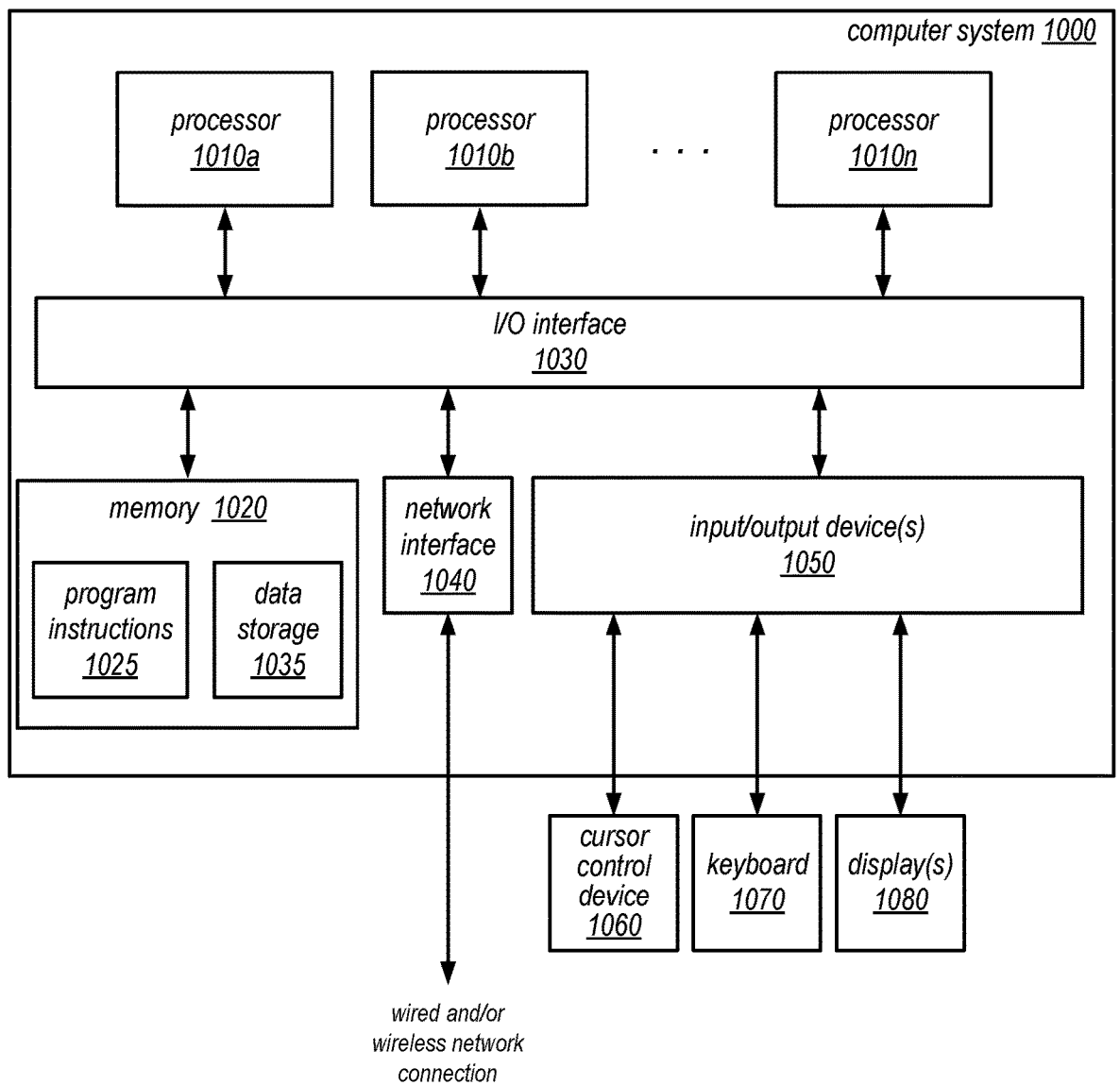
FIG. 9 illustrates an example system to implement the various methods, techniques, and systems described herein, according to some embodiments.

As shown in FIG. 9, memory 1020 may include program instructions 1025, may implement the various methods and techniques as described herein, such as techniques to implement predicting query performance for prioritizing query execution, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  at least one processor; and
  a memory, storing program instructions that when executed by the at least one processor, cause the at least one processor to implement:
    receive a query;
    apply a machine learning model trained using a database system to predict a performance measure of the query at the database system;
    compare the predicted performance measure of the query with other respective performance measures predicted for one or more other received queries waiting to be performed to determine a priority for performing the query at the database system according to a comparison;
    select the query from amongst the one or more other received queries waiting to be performed for performance according to the determined priority; and
    perform the selected query.

2. The system of claim 1, wherein the database system is further configured to:
  for a number of queries received prior to the query that exceed a training threshold for performance prediction:
    extract respective one or more features from individual ones of the number of queries;
    track respective actual performance measures for the individual ones of the number of queries; and
    train the machine learning model using the extracted one or more features and the tracked actual performance measures.

3. The system of claim 1, wherein the database system is further configured to:
  responsive to a determination that an actual performance measure for the query exceeds the predicted performance measure, adjust the priority of the query lower.

4. The system of claim 1, wherein the database system is implemented as part of a data warehouse service offered by a provider network and wherein the database system is distributed across a plurality of nodes that perform the query.

5. A method, comprising:
  receiving a query at a database system;
  applying a machine learning model trained using the database system to predict a performance measure of the query at the database system;
  determining a priority for performing the query at the database system according to a comparison of the predicted performance measure of the query with other respective performance measures predicted for one or more other received queries waiting to be performed; and
  selecting the query from amongst the one or more other received queries waiting to be performed for performance according to the determined priority.

6. The method of claim 5, further comprising:
  responsive to determining that an actual performance measure for the query exceeds the predicted performance measure, adjusting the priority of the query lower.

7. The method of claim 5, further comprising:
  responsive to a request, disabling performance measure prediction for subsequently received queries at the database system.

8. The method of claim 5, wherein determining the priority for performing the query at the database system comprises applying a baseline priority to the query after determining that the predicted performance measure is less than an average performance measure value for the one or more waiting queries.

9. The method of claim 5, wherein selecting the query from amongst the one or more other received queries waiting to be performed for performance according to the determined priority comprises applying a priority weighted round-robin selection technique.

10. The method of claim 5, wherein the predicted performance measure is total query execution time.

11. The method of claim 5, further comprising:
  for a number of queries received prior to the query that exceed a training threshold for performance prediction:
    extracting respective one or more features from individual ones of the number of queries;
    tracking respective actual performance measures for the individual ones of the number of queries; and
    training the machine learning model using the extracted one or more features and the tracked actual performance measures.

12. The method of claim 5, further comprising:
for a number of queries received after to the query that exceed a training threshold for performance prediction:
extracting respective one or more features from individual ones of the number of queries;
tracking respective actual performance measures for the individual ones of the number of queries; and
training a new machine learning model using the extracted one or more features and the tracked actual performance measures; and
replacing the machine learning model with the new machine learning model for predicting performance measures for queries.

13. The method of claim 5, wherein queries received prior to the query are not performed according to respective predicted performance measures until training of the machine learning model is completed.

14. One or more non-transitory, computer-readable storage media, storing program instructions that when executed on or across one or more computing devices cause the one or more computing devices to implement:
receiving a query at a database system;
applying a machine learning model trained using the database system to predict a performance measure of the query at the database system;
determining a priority for performing the query at the database system according to a comparison of the predicted performance measure of the query with other respective performance measures predicted for one or more other received queries waiting to be performed; and
performing the query when selected from amongst the one or more other received queries waiting to be performed for performance according to the determined priority.

15. The one or more non-transitory, computer-readable storage media of claim 14, storing further instructions that when executed on or across the one or more computing devices cause the one or more computing devices to further implement:
for a number of queries received prior to the query that exceed a training threshold for performance prediction:
extracting respective one or more features from individual ones of the number of queries;
tracking respective actual performance measures for the individual ones of the number of queries; and
training the machine learning model using the extracted one or more features and the tracked actual performance measures.

16. The one or more non-transitory, computer-readable storage media of claim 14, wherein the predicted performance measure is memory usage.

17. The one or more non-transitory, computer-readable storage media of claim 14, storing further instructions that when executed on or across the one or more computing devices cause the one or more computing devices to further implement:
responsive to determining that an actual performance measure for the query exceeds the predicted performance measure, adjusting the priority of the query lower.

18. The one or more non-transitory, computer-readable storage media of claim 14, storing further instructions that when executed on or across the one or more computing devices cause the one or more computing devices to further implement:
responsive to a request, enabling performance measure prediction prior to receiving the query at the database system.

19. The one or more non-transitory, computer-readable storage media of claim 18, storing further instructions that when executed on or across the one or more computing devices cause the one or more computing devices to further implement disabling preemption of queries being executed responsive to the request.

20. The one or more non-transitory, computer-readable storage media of claim 14, wherein the database system is implemented as part of a database service offered by a provider network and wherein the database system is distributed across a plurality of nodes that perform the query.

* * * * *